United States Patent
Carruesco Llorens et al.

(10) Patent No.: US 11,663,693 B2
(45) Date of Patent: May 30, 2023

(54) GENERATING DOWNSCALED IMAGES REPRESENTING AN OBJECT TO BE GENERATED IN ADDITIVE MANUFACTURING

(71) Applicant: HEWLETT-PACKARD DEVELOPMENT COMPANY, L.P., Spring, TX (US)

(72) Inventors: Alex Carruesco Llorens, Sant Cugat del Valles (ES); Sergio Gonzalez Martin, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,567

(22) PCT Filed: Jun. 26, 2018

(86) PCT No.: PCT/US2018/039531
§ 371 (c)(1),
(2) Date: Oct. 16, 2019

(87) PCT Pub. No.: WO2020/005211
PCT Pub. Date: Jan. 2, 2020

(65) Prior Publication Data
US 2021/0407038 A1    Dec. 30, 2021

(51) Int. Cl.
*G06K 9/32* (2006.01)
*G06T 3/40* (2006.01)
(Continued)

(52) U.S. Cl.
CPC ............. *G06T 3/40* (2013.01); *B29C 64/386* (2017.08); *G06T 11/001* (2013.01); *B33Y 50/02* (2014.12)

(58) Field of Classification Search
None
See application file for complete search history.

(56) References Cited

U.S. PATENT DOCUMENTS 7,290,221 B2    10/2007    Anderson et al.
7,817,339 B2    10/2010    Lee
(Continued)

FOREIGN PATENT DOCUMENTS

EP    3272504 A1    1/2018

OTHER PUBLICATIONS

Improve the efficiency of scanning and processing 3D objects et al., "Non-contact reverse engineering modeling for additive manufacturing of down scaled cultural artefacts", 10th CIRP Conference on Intelligent Computation in Manufacturing Engineering —CIRP ICME '16, Procedia CIRP 62 (2017 ), pp. 481-486.*

*Primary Examiner* — Guillermo M Rivera-Martinez
(74) *Attorney, Agent, or Firm* — Michael Dryja (57) ABSTRACT

In an example, an apparatus comprises processing circuitry, the processing circuitry comprising: memory, to store a two-dimensional pixel representation of a layer of an object to be made in an additive manufacturing process and pixel information, the pixel information specifying pixels representing a surface of the object and colour for the pixels representing the surface; and an image processor, to generate a downscaled representation of the layer and to process the downscaled representation to propagate colour from pixels representing the surface of the object in the downscaled representation to neighbouring pixels representing an interior of the object in the downscaled representation.

16 Claims, 4 Drawing Sheets

(51) Int. Cl.
*B29C 64/386* (2017.01)
*G06T 11/00* (2006.01)
*B33Y 50/02* (2015.01)

(56) References Cited

U.S. PATENT DOCUMENTS

| | | | |
|---|---|---|---|
| 8,977,076 B2 | 3/2015 | Samadani et al. | |
| 9,342,768 B2 | 5/2016 | Nakano et al. | |
| 9,473,760 B2 | 10/2016 | Buser et al. | |
| 9,946,816 B2 * | 4/2018 | Kim | G06F 30/20 |
| 2002/0086247 A1 | 7/2002 | Coe | |
| 2004/0217956 A1 * | 11/2004 | Besl | G06T 15/205 |
| | | | 345/419 |
| 2006/0235562 A1 * | 10/2006 | Knoppers | G05B 19/4099 |
| | | | 700/119 |
| 2009/0132081 A1 * | 5/2009 | Schillen | B33Y 50/02 |
| | | | 700/120 |
| 2010/0125356 A1 * | 5/2010 | Shkolnik | G06T 5/006 |
| | | | 700/98 |
| 2011/0196529 A1 | 8/2011 | Shkolnik et al. | |
| 2011/0222081 A1 * | 9/2011 | Yi | G06T 17/00 |
| | | | 358/1.9 |
| 2012/0106835 A1 | 5/2012 | Bernal et al. | |
| 2014/0324204 A1 * | 10/2014 | Vidimce | B29C 64/386 |
| | | | 700/98 |
| 2016/0110917 A1 * | 4/2016 | Iverson | G06T 17/205 |
| | | | 345/420 |
| 2016/0297146 A1 | 10/2016 | Wu | |
| 2016/0314617 A1 * | 10/2016 | Forster | A63F 13/63 |
| 2017/0039759 A1 * | 2/2017 | Huet | G06T 9/001 |
| 2017/0368755 A1 * | 12/2017 | Bader | G05B 19/4099 |
| 2018/0032060 A1 * | 2/2018 | Zeng | G05B 19/4099 |
| 2018/0126663 A1 * | 5/2018 | Jun | B33Y 50/02 |
| 2018/0150058 A1 * | 5/2018 | Shapiro | G05B 19/4097 |
| 2020/0122406 A1 * | 4/2020 | Bigos | G06F 3/1255 |
| 2021/0331403 A1 * | 10/2021 | Ramirez Muela | B33Y 50/02 |
| 2021/0346091 A1 * | 11/2021 | Haslam | G16H 10/60 |

* cited by examiner

GENERATING DOWNSCALED IMAGES REPRESENTING AN OBJECT TO BE GENERATED IN ADDITIVE MANUFACTURING

BACKGROUND

Three-dimensional (3D) printing is an additive manufacturing process in which three-dimensional objects may be formed, for example, by the selective solidification of successive layers of a build material. The object to be formed may be described in a data model. Selective solidification may be achieved, for example, by fusing, binding, sintering, or extrusion. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a build bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner. According to one example, a suitable fusing agent may be an ink-type formulation comprising carbon black, such as, for example, the fusing agent formulation commercially known as V1Q60Q "HP fusing agent" available from HP Inc. In one example such a fusing agent may additionally comprise an infra-red light absorber. In one example such an ink may additionally comprise a near infra-red light absorber. In one example such a fusing agent may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from HP Inc. According to one example, a suitable detailing agent may be a formulation commercially known as V1Q61A "HP detailing agent" available from HP Inc. According to one example, a suitable build material may be PA12 build material commercially known as V1R10A "HP PA12" available from HP Inc.

Other solidification techniques may apply a binder to a layer of build material to cause solidification of selective portions of the build material. For example, this may involve depositing a binder on a powder, curing the binder to hold the powder together, and sintering or consolidating the powder. Yet other solidification techniques may involve sintering or melting of a powder such as a metallic powder.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Figure 1:
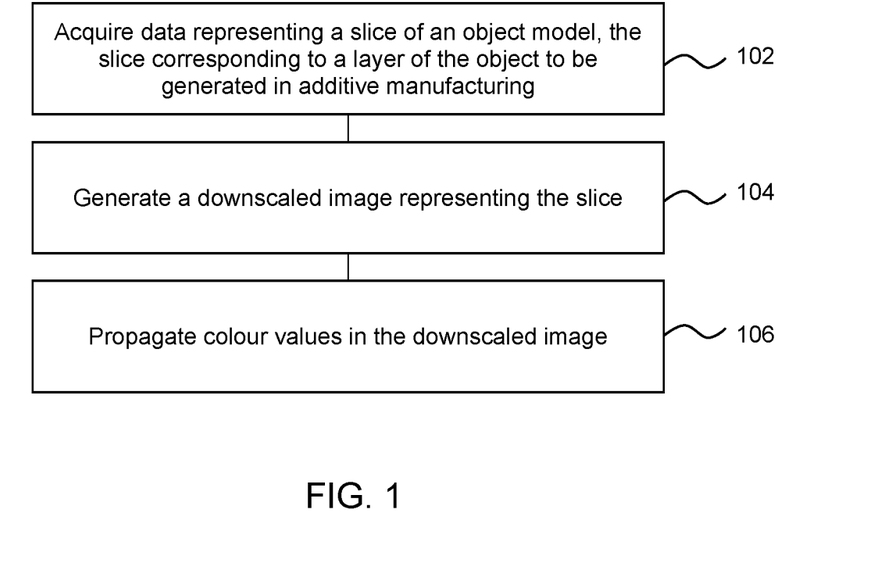
FIG. 1 is a flowchart of an example method for generating a downscaled image.

FIG. 1 is a flowchart of a method, which may be a computer implemented method, comprising, in block 102 acquiring data representing a slice of an object model, the slice corresponding to a layer of the object to be generated in additive manufacturing. The data comprises a two-dimensional set of pixels at a given resolution and pixel properties.

Figure 2:
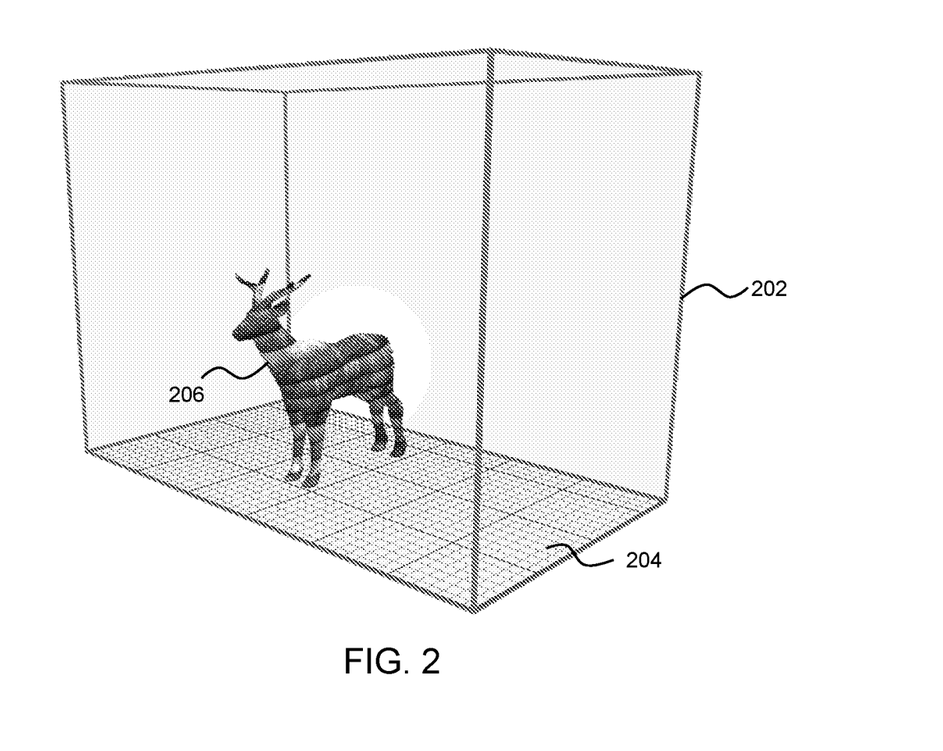
FIG. 2 depicts a three-dimensional model of an object to be generated by additive manufacturing.

The acquired data representing the slice of the object model may be determined from a print job which may be, or may include, a design file such as a STL file, a .OBJ file, a DXF file, a json file, a 3MF file, a vtk file, or the like. For example, a 3MF file may contain object data comprising model, material, and property data for at least one part (i.e. at least one volume) of a three-dimensional object. FIG. 2 is a representation of a three-dimensional object that may be defined by object data contained in a design file such as a 3MF file. The representation comprises a polygon mesh 206 of the object and a texture map that defines colours of the object (note that in FIG. 2 the colours are represented in black and white or in shades of gray). Also depicted are a build box 202 and build bed 204, as well as origin of coordinates, which in this particular example are defined according to the 3MF specification. In some examples, the object data may be rendered into an internal format of the additive manufacturing apparatus. Every individual part in the print job may be individually processed. Then, when the print job is sent to be executed, the acquired data representing the slice of the object model may be determined from the object data (as will be described later on), which may be provided as input for writing system operations. It will be understood, of course, that the design file may be processed in advance so that the acquired data representing the slice of the object model may be held in or received from a memory, received over a network, received over a communications link or the like, or acquired in some other way.

In some examples, the object property data for a part of a three-dimensional object comprises at least one of:
(i) a shape property,
(ii) a shell property,
(iii) a colour property, and
(iv) a surface normal property.

The shape property comprises information specifying voxels which belong to the solid portion of the part of the three-dimensional object.

The shell property comprises information specifying voxels which belong to the solid portion of the part and have at least one neighbouring space having no voxel (i.e. the shell property specifies whether a voxel belongs to the 3D surface of the part).

The colour property comprises information about the surface colour. The colour may be defined in a colour space, such as: a monochrome contone space, e.g. grayscale; a Red, Green, Blue (RGB) colour space; the International Commission on Illumination (CIE) 1931 XYZ colour space, wherein three variables ('X', 'Y' and 'Z' or tristimulus values) are used to model a colour; the CIE 1976 (L*, a*, b*-CIELAB or 'LAB') colour space, wherein three variables represent lightness ('L') and opposing colour dimensions ('a' and 'b'); or any other colour space or derived colour space. A colour value in these colour spaces may comprise a continuous tone value, e.g. a value within a predefined range of values. For example, in a simple case, an RGB colour value may comprise three 8-bit values; as such each red, green and blue value may be within the range of 0 to 255.

The surface normals comprise vectors which are perpendicular to the three-dimensional surface of the part. They may be specified for voxels of the shell property, i.e., for voxels on the surface of the part, and thus may describe a contour of the part.

The object property data may be stored in, e.g. four, respective buffers that are of sufficient size to hold the object properties for an entire part.

In some examples, the model of the three-dimensional object is processed to generate slices of parallel planes. For example, in a three-dimensional space that uses a three-coordinate system, e.g. that uses [x, y, z] co-ordinates, the parallel planes may be z-slices, planes that are parallel to x and y axes. Each z-slice may comprise a set of voxels having the same z-axis address, i.e. each slice may be one voxel thick. The number of z-slices may depend on a resolution of detail in the z dimensions and/or the output resolution of a layer of one or more build materials. Voxels of the model that are intersected by a plane may be considered as belonging to the volume of the part and may be 'marked' as "solid"; the rest of the plane may be 'marked' as "empty". The "solid" voxels may define the shape property. The voxels belonging to a surface of the part may comprise a subset of the "solid" voxels, for example those voxels which are "solid" and which have at least a neighbouring space which is "empty". This subset of voxels may define the shell property. Color values may be assigned to voxels that define the shell property and may be assigned the corresponding color from the input model. Normal values may be assigned to voxels that define the shell property, with a value that is computed from the surface polygons of the input geometry.

A two-dimensional representation, such as a raster image, may be generated for each slice based on the object data. In some examples, each voxel of a z-slice corresponds to a pixel in a two-dimensional representation of a slice. Positions of pixels in the two-dimensional representation of the slice may be determined from x and y coordinates of voxels of that slice. Pixels representing solid portions of an object in a two-dimensional representation of the slice may correspond to voxels specified by the shape property for the slice, and pixels representing a surface of the object in the two-dimensional representation of the slice may correspond to a subset of the voxels as specified by the shell property for the slice. In some examples, pixels in the two-dimensional representation of the slice may be 'marked' according to if they are "blank", "solid" or "belong to a surface". Colour values of the pixels representing the surface of the object in the two-dimensional representation may be determined from the colour property of the corresponding subset of the voxels.

Referring again to FIG. 1, block 104 comprises generating a downscaled image representing the slice of the object, from the data acquired in block 102. The downscaled image comprises pixels which represent the surface of the object. The downscaling may reduce the number of pixels used to represent the image of the print layer, using a filtering process which selectively removes certain pixel data, a consolidation process (such as averaging) which combines or consolidates pixel values from multiple pixels into a single, representative pixel, or any other suitable technique.

In some examples, the downscaled colour image is generated by averaging the pixels representing the surface of the object in the two-dimensional representation of the slice. This may involve determining a representative pixel out of an array of pixels (e.g., a square array of, for example, 2×2 or 3×3 pixels) including one or more pixels representing the surface of the object. As noted above, the pixels representing the surface of the object may correspond to a subset of the voxels as specified by the shell property. The downscaling results in a low-resolution colour image, where the colour is a thin line along the shell of the layer to print.

Figure 3:
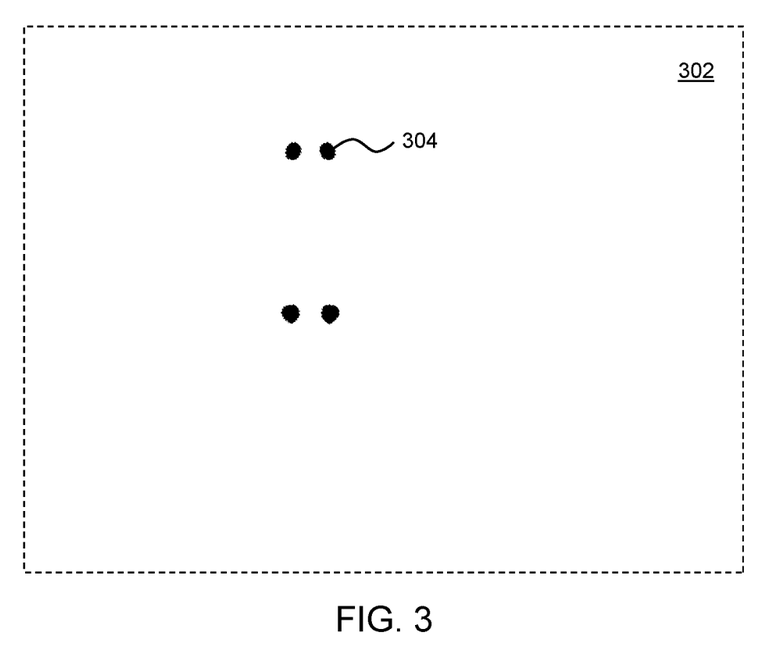
FIG. 3 is an image corresponding to a shape property of a slice of the object model shown in FIG. 2.
Figure 4:
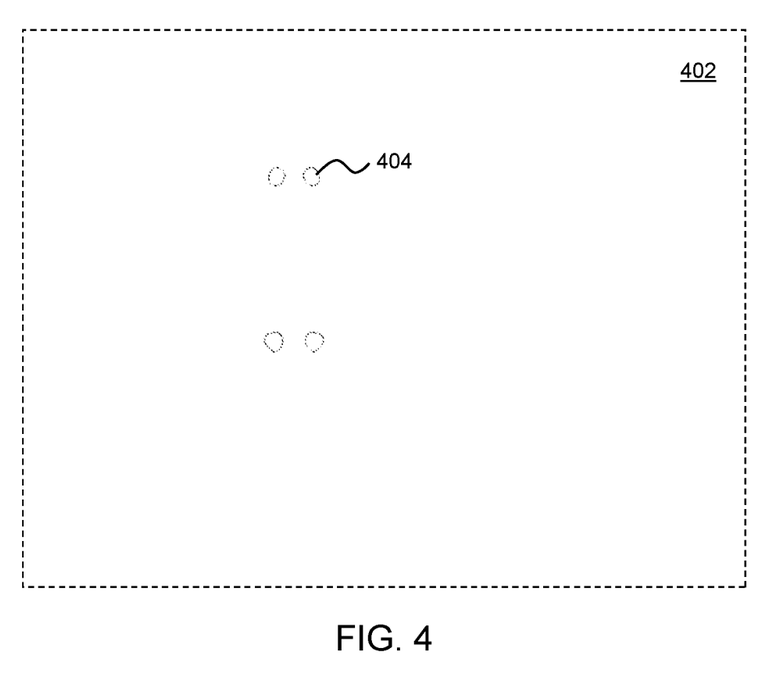
FIG. 4 is an image corresponding to a shell property of a slice of the object model shown in FIG. 2.

FIGS. 3 and 4 show bed layer images 302 and 402 corresponding to the shape and shell properties for an arbitrary layer of the three-dimensional object shown in FIG. 2. (The bed layer image for the colour property is not shown, since it will be apparent that it is substantially the same as the bed layer image shown in FIG. 4 except for having different colour values.) For reasons of simplicity, reference will be made to pixels when describing FIGS. 3 and 4, as these figures can be considered as two-dimensional representations of an arbitrary slice of the three-dimensional object, with the understanding that reference could also have been made to voxels. In order to fit onto the page, the images have been reduced in size (i.e. resolution) compared to the size of the original bed layer images. This downsizing can be considered representative of the downscaling performed in block 104 of FIG. 1. For example, some 3D printers may work at a high resolution of 600 voxels per inch, with the colour information of vertical/diagonal geometry represented by thin lines having a thickness of 1 or 2 pixels in the image while the image dimensions are around 9000×5000 pixels. On the other hand, a downscaled bed layer image of, for example, 2250×1250 pixels at 150 dpi may be used for, among other things, exporting via a web service to an external software application. Furthermore, it may also be desirable to display a thumbnail of the bed layer image on a front panel display of an additive manufacturing apparatus to enable a user to preview the layer that is being generated. The typical dimensions of such a front panel display may be around 500×300 pixels at about 33 dpi.

In FIG. 3, pixels 304 which represent solid portions of the object are depicted as solid shapes, and these are fairly visible. However, in FIG. 4, voxels 404 which represent the surface of the object are less visible. This is because the surface of the object is generally represented by thin lines having a thickness of 1 or 2 pixels, and because colour information may be present in those pixels representing the surface of the object. Furthermore, some of the colour information may be removed during the downscaling process. This may make it difficult to identify the shell and colour properties on screens having a low resolution such as front panel displays.

Block 106 comprises propagating the colour values of the pixels representing the surface of the object in the downscaled image to pixels representing an interior of the object in the downscaled image.

In some examples, the propagation of colour values comprises applying a colour value from a pixel to a neighbouring pixel. Where two or more pixels have a common neighbouring pixel, an average colour value of the two or more pixels may be applied to the common neighbouring pixel. For example, the colour propagation may comprise applying a colour value from a pixel representing a surface of the object to a neighbouring pixel representing a solid portion of the object, or applying an average colour value of two or more pixels representing a surface of the object to a common neighbouring pixel representing a solid portion of the object as the case may be. In some examples, once the propagation of colour values from pixels representing the surface of the object has been carried out, the propagation of colour values is repeated by applying a colour value from the neighbouring pixels to next neighbouring pixels representing the solid portion of the object. In other words, the colour propagation may be carried out iteratively towards the interior of the object, starting from the pixels representing the surface of the object.

Figure 5:
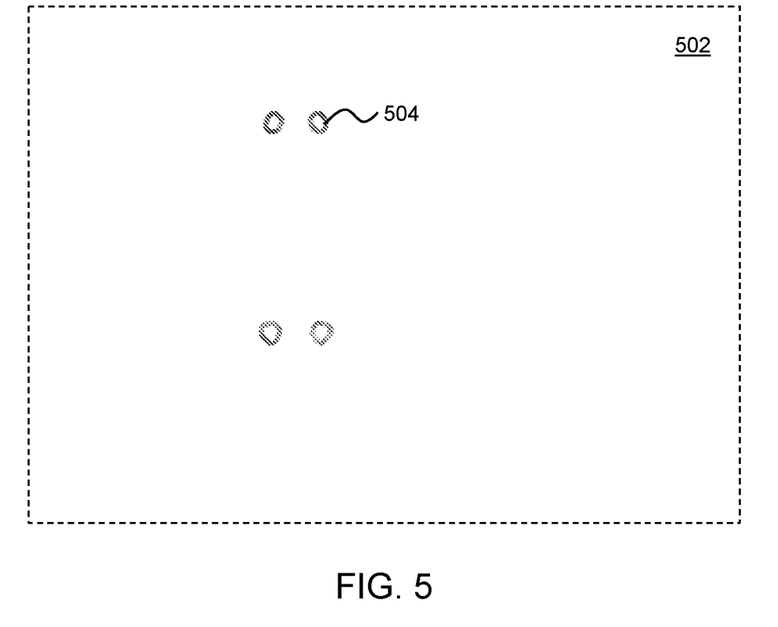
FIG. 5 is a downscaled image of a slice of the object model shown in FIG. 2.
Figure 6:
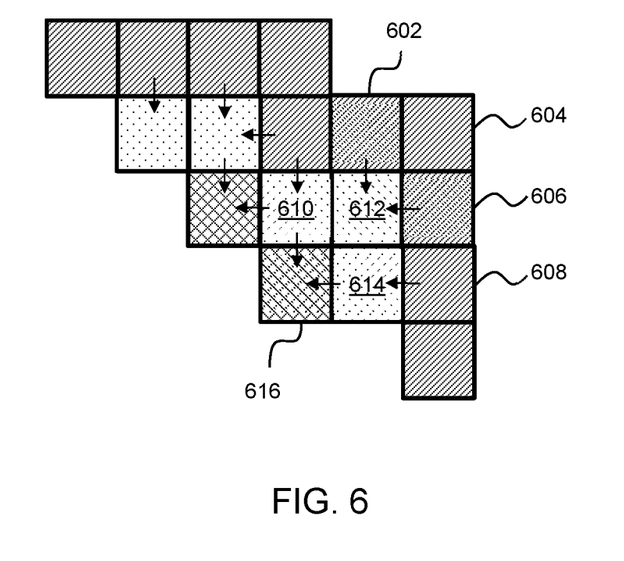
FIG. 6 schematically illustrates a selection of pixels of the downscaled image of FIG. 5.

FIG. 5 shows a downscaled image 502 in which colour values have been propagated from the surface pixels to pixels 504 in the interior of the object, with FIG. 6 schematically showing a detailed view of a selection of pixels of the downscaled image shown in FIG. 5. In FIG. 6, pixels representing a surface of the object are depicted as hatched squares, e.g., pixels 602, 604, 606, 608, neighbouring pixels representing an interior of the object are depicted as dot-filled squares, e.g., pixels 610, 612, 614, and next neighbouring pixels representing the interior of the object are depicted by cross-hatched squares, e.g., pixel 616. The colour propagation is represented by arrows. Thus, in this example, the colour value of pixel 612 is obtained as the average of the colour values of pixels 602, 606, and the colour value of pixel 614 is obtained as the colour value of pixel 608. Similarly, the colour value of pixel 616 is obtained as the average of the colour values of pixels 610, 614.

The colour propagation may be applied to a predefined number of pixels into the interior of the object. Since the colour propagation is applied towards the interior of the parts, the shape of the part is not modified (as would be the case if, for example, the colour propagation was applied outwards of the parts).

In other examples, the propagation may be carried out by specifying a kernel of pixels (i.e., a group of pixels) centred on a pixel representing the surface of the object in the two-dimensional representation, and then propagating the colour from the central pixel to neighbouring pixels in the kernel representing the solid portion of the objection. The kernel may be square, circular, or any other shape, and may have a configurable size. For example, a circular kernel may have a configurable radius of, for example, 12 pixels. The colour propagation may be 'directional', in that the colour value of the central pixel may be applied to pixels in the positive or negative y directions ('vertical' directions) that are marked as "solid", and then for each pixel advanced in one of these direction, the colour value is applied from that "solid" pixel to neighbouring pixels in the positive and negative x directions ('horizontal' directions) that are marked as "solid". The colour propagation may be continued in the x and y directions for as long as the pixel to which colour is propagated is marked as "solid" and is in the kernel, otherwise the propagation for that direction is aborted and advanced in the other directions until there are no more pixels to visit. In some examples, the colour propagation is not applied to pixels that were marked as "blank". It will be appreciated that the process could be performed first in the positive and negative x directions and then the positive or negative y directions.

In some examples, the colour value for each pixel of the downscaled image that is to be displayed is set as follows: the pixels outside the part will not have colour; the pixels representing the surface of the part will keep the original averaged colour resulting from the downscaling process; the pixels inside the part will have the colour values that were obtained by the colour propagation process (as described above); and the pixels inside the part to which no colour propagation was applied will have a "solid" colour, which may be an arbitrary colour to depict the interior of the printed parts.

In some examples, information about whether a particular pixel is "solid", "empty" or "part of the 3D surface" is encoded in the downscaled image. This information can be stored in an "alpha channel" of the downscaled image. Here, the "alpha channel" is used as a representative example of a "transparency information channel", without limiting to codecs in which the transparency information is specifically provided under the name or form of an actual "alpha channel".

Propagating colour from pixels representing the surface of the object to pixels representing the interior of the object in the downscaled image, may allow the colour of the surface to be more easily identified when the downscaled image is displayed on a low resolution display such as a front panel. In other words, it can allow displaying of a layer preview thumbnail from which a user can more easily identify the regions where the additive manufacturing apparatus is generating colour content. However, in other examples the colour propagating techniques may be applied to enable a 3D render of the object to be displayed.

Encoding the information about the shell property in the alpha channel may allow regression testing (e.g. 3MF language regression tests), since coloured pixels corresponding to the object data and representing the surface of the object can be distinguished from pixels to which colour propagation has been applied.

Figure 7:
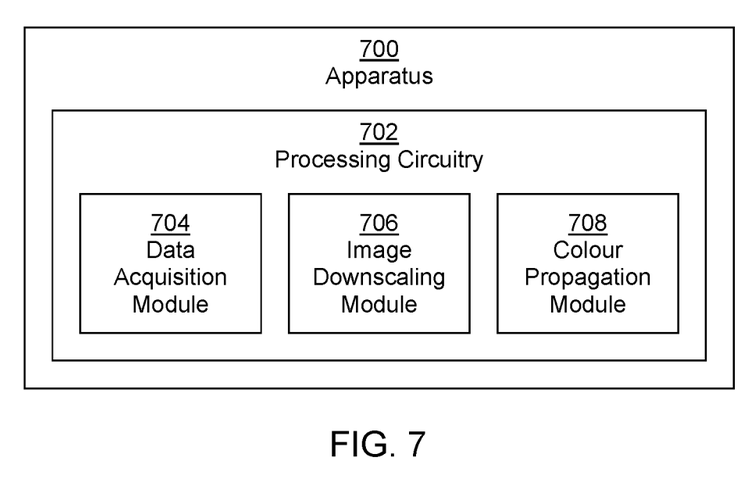
FIG. 7 is an example of apparatus for additive manufacturing.

FIG. 7 is an example of an apparatus 700 comprising processing circuitry 702. In this example, the processing circuitry 702 comprises a data acquisition module 704, an image downscaling module 706 and a colour propagation module 708.

In use of the apparatus 700, the data acquisition module 704 acquires image data, the image downscaling module 706 downscales the image data, and the colour propagation module 708 propagates the colour in the image data. As such, the processing circuitry 702 may carry out the method of FIG. 4 above. Each of the modules 704, 706, 708 may be provided by a processor executing machine-readable instructions.

Figure 8:
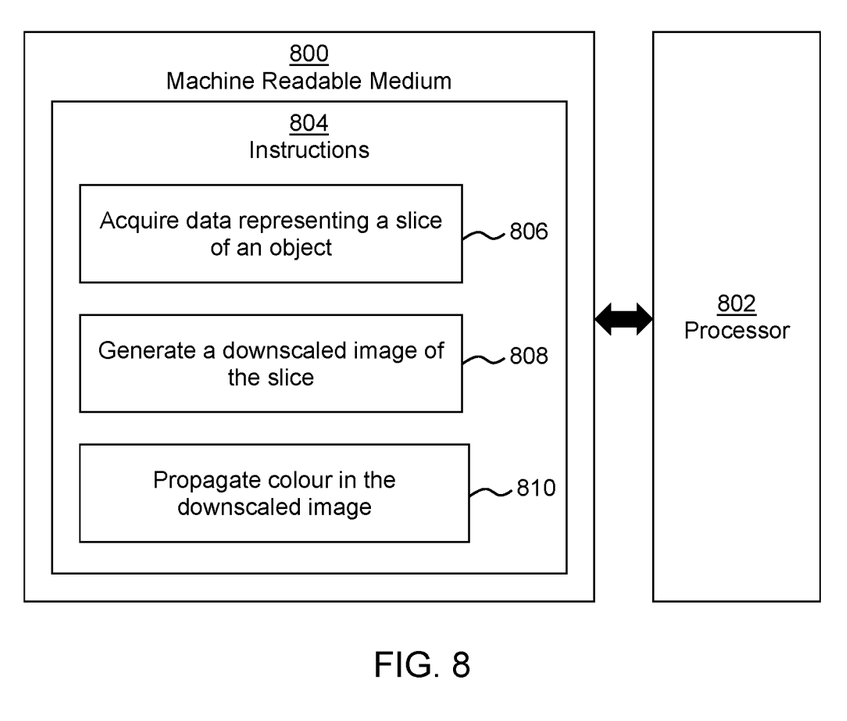
FIG. 8 is an example of a machine readable medium associated with a processor.

FIG. 8 is an example of a tangible, non-transitory, machine readable medium 800 in association with a processor 802. The machine readable medium 800 stores instructions 804 which may be non-transitory and which, when executed by the processor 802, cause the processor 802 to carry out processes. The instructions 804 comprise instructions 806 to acquire image data representing a layer of an object to be generated in a layer-by-layer additive manufacturing process and image-related data, the image data comprising a two-dimensional array of pixels, the image-related data identifying pixels representing a surface of the object and colour values for the pixels representing the surface, instructions 808 to generate downscaled image data by reducing a resolution of the image data, and instructions 810 to propagate the colour values of pixels representing the surface of the object in the downscaled image data to neighbouring pixels representing an interior of the object in the downscaled image data. Such instructions may comprise downscaling algorithms to average pixels, and colour propagation algorithms to average colour values of pixels, as described above with reference to FIGS. 5 and 6.

In some examples, the instructions 804 may comprise instructions to cause the processor 802 to carry out at least one block of FIG. 1. In some examples, the instructions 804 may comprise instructions to cause the processor 804 to act as a module of FIG. 7.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the data acquisition module 704, the image downscaling module 706, and the image processing module 708) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   generating, by at least one processor, an image representing a slice of an object based on data including a two-dimensional set of pixels at a given resolution and pixel information, the pixel information specifying pixels representing a surface of the object and color of the pixels representing the surface, the slice corresponding to a layer of the object to be generated via additive manufacturing process;
   downscaling, by the at least one processor, the image representing the slice of the object to generate a downscaled image, the downscaled image including the pixels representing the surface of the object and color values of the pixels representing the surface of the object;
   modifying the downscaled image to include pixels representing an interior of the object in the downscaled image by propagating, by the at least one processor, the color values of the pixels representing the surface of the object in the downscaled image to color values of the pixels representing the interior of the object in the downscaled image, and
   generating the object via the additive manufacturing process, using the downscaled image as been modified.

2. The method according to claim 1, wherein the propagating of the color values includes one or more of:
   applying a color value of each pixel representing the surface of the object to a neighboring one of the pixels representing the interior of the object, or applying an average color value of two or more of the pixels representing the surface of the object to a common neighboring one of the pixels representing the interior of the object.

3. The method according to claim 1, wherein the propagating of the color values includes specifying a kernel of pixels centered on a first pixel of the pixels representing the surface of the object, and applying the color value of the first pixel representing the surface of the object to pixels inside the kernel.

4. The method according to claim 3, further including applying the color value from the first pixel representing the surface of the object to a neighboring pixel in one of an x-direction or a y-direction, and from the neighboring pixel to a next neighboring pixel arranged in the other of the x-direction or the y-direction to the arranged pixels.

5. The method according to claim 3, wherein the kernel includes one of: a circular group of pixels or a square group of pixels.

6. The method according to claim 1, further including storing, by at least one processor, pixel information in a transparency information channel of the processed downscaled image, the pixel information including information identifying the pixels representing the surface of the object in the processed downscaled image and information identifying the pixels representing the interior of the object in the processed downscaled image.

7. The method according to claim 1, further including controlling, by at least one processor, a display unit to present the processed downscaled image.

8. An apparatus comprising:
   memory;
   machine-readable instructions; and
   processor circuitry to execute the machine-readable instructions to:
   generate an image representing a layer of an object to be generated via an additive manufacturing process based on data including a two-dimensional set of pixels at a given resolution and pixel information, the pixel information including pixels representing a surface of the object and color for the pixels representing the surface;
   downscale the image representing the layer to generate a downscaled image, the downscaled image including the pixels representing the surface of the object and color values of the pixels representing the surface of the object;
   modify the downscaled image to include pixels representing an interior of the object in the downscaled image by propagating the color values of the pixels representing the surface of the object in the downscaled image to color values of the pixels representing the interior of the object in the downscaled image, and
   cause the object to be generated via the additive manufacturing process using the downscaled image as has been modified.

9. The apparatus according to claim 8, wherein the processor circuitry is to one or more of: apply a color value of each pixel representing the surface of the object to a neighboring one of the pixels representing the interior of the object, or apply an average color value of two or more of the pixels representing the surface of the object to a common neighboring one of the pixels representing the interior of the object.

10. The apparatus according to claim 9, wherein the processor circuitry is to specify a kernel of pixels centered on a first pixel of the pixels representing the surface of the object, and apply the color value of the first pixel representing the surface of the object to pixels inside the kernel.

11. The apparatus according to claim 8, wherein the processor circuitry is to apply the color value from the first pixel representing the surface of the object to a neighboring pixel in one of an x-direction or a y-direction, and from the neighboring pixel to a next neighboring pixel arranged in the other of the x-direction or the y-direction to the arranged pixels.

12. The apparatus according to claim 8, wherein the processor circuitry is to encode the pixel information in a transparency information channel of the downscaled image, the pixel information distinguishing between the pixels representing the surface of the object in the downscaled image and the pixels representing the interior of the object in the downscaled image.

13. The apparatus according to claim 8, further including a display unit to display the downscaled image.

14. A non-transitory tangible machine readable memory device storing instructions which, when executed by a processor, cause the processor to at least:
   generate an image representing a layer of an object to be generated in a layer-by-layer additive manufacturing process based on pixel data, the image including a two-dimensional array of pixels, the pixel data identifying pixels representing a surface of the object and color values for the pixels representing the surface;
   downscale the image by reducing a resolution of the image to generate a downscaled image, the downscaled image including the pixels representing the surface of the object and color values of the pixels representing the surface of the object; and
   modify the downscaled image to include pixels representing an interior of the object in the downscaled image by propagating the color values of the pixels representing the surface of the object in the downscaled image to determine color values of the pixels representing the interior of the object in the downscaled image.

15. The non-transitory tangible machine readable memory device according to claim 14, further storing instructions which, when executed by the processor, cause the processor to encode pixel information in an alpha channel of the downscaled image, the pixel information identifying the pixels representing the surface of the object in the processed downscaled image and the pixels representing the interior of the object in the processed downscaled image.

16. The non-transitory tangible machine readable memory device according to claim 14, further storing instructions which, when execute by the processor, cause the object to be generated via the additive manufacturing process using the downscaled image as has been modified.

* * * * *